Feb. 17, 1959 T. A. TARR 2,874,199
FRACTIONAL CRYSTALLIZATION PROCESS AND APPARATUS
Filed Dec. 22, 1954
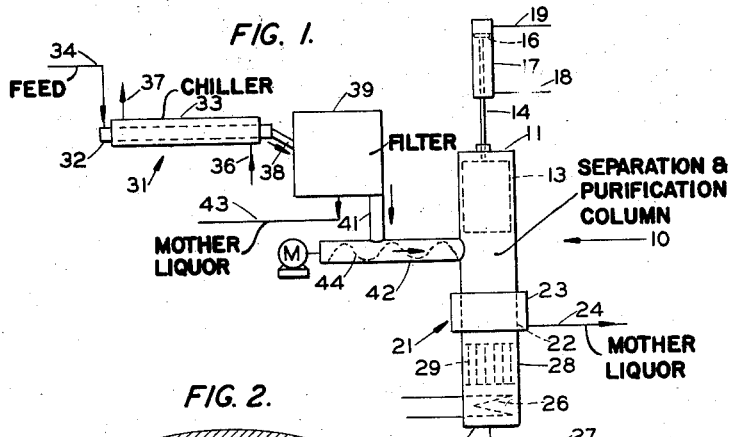
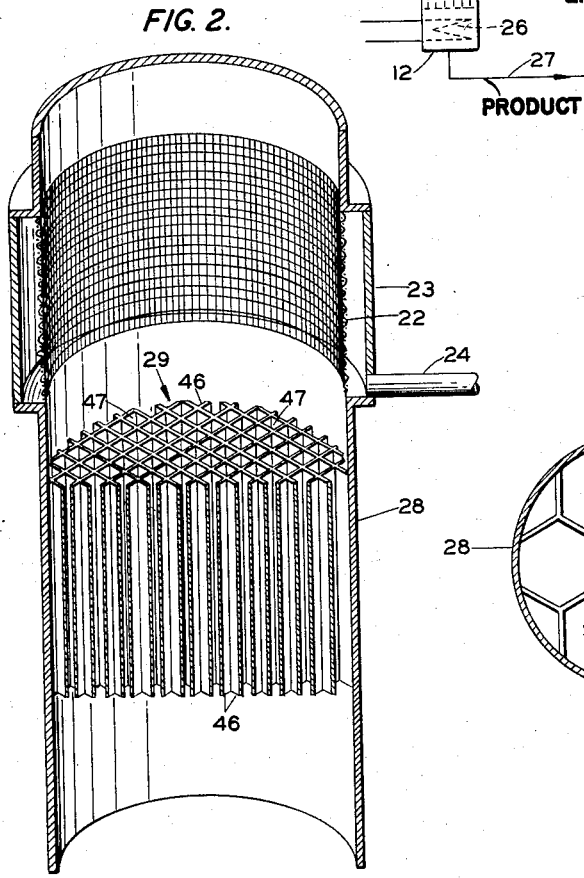
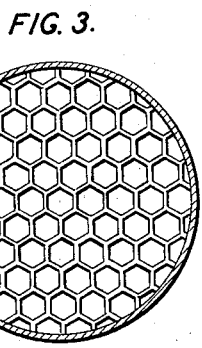
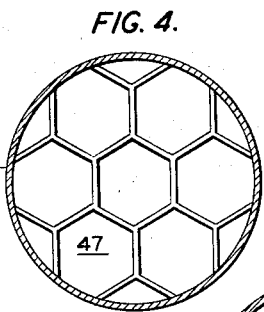
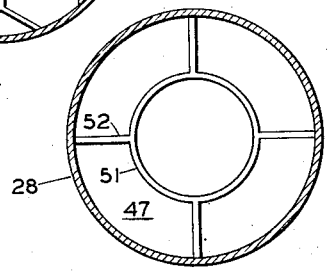
INVENTOR.
T. A. TARR
BY *Hudson and Young*
ATTORNEY United States Patent Office 2,874,199
Patented Feb. 17, 1959

2,874,199

FRACTIONAL CRYSTALLIZATION PROCESS AND APPARATUS

Thomas A. Tarr, Bartlesville, Okla., assignor to Phillips Petroleum Company, a corporation of Delaware Application December 22, 1954, Serial No. 477,099

18 Claims. (Cl. 260—666)

This invention relates to the separation and purification of components from liquid mixtures. In one of its more specific aspects, it relates to separation and purification of liquid multi-component mixtures by fractional crystallization. In another of its more specific aspects, it relates to improved fractional crystallization apparatus which includes means for preventing plugging of the purification column of the apparatus and for reducing channeling of reflux liquid therethrough.

The separation of chemical compounds by means of crystallization finds many applications in industrial installations. While many separations can be made by distillation or solvent extraction, there are cases where these methods are impracticable or impossible, and the desired separation can be effected more advantageously by means of crystallization. Thus, in the case of chemical isomers having similar boiling points and solubilities, or materials having relatively high boiling ranges, or thermally unstable substances, separation by crystallization may well be the only method which can be advantageously employed.

As well as offering perhaps the only practicable method of separation, the crystallization method offers the further advantage of being the only separation method which theoretically gives a pure product in a single stage of operation. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the process is carried.

More recently, a continuous method of separating and purifying liquid multi-component mixtures has been advanced which overcomes the disadvantages of conventional fractional crystallization processes. This method involves the use of purification column in one end of which a melting section is maintained. The crystals upon introduction into the purification column are moved therethrough toward the melting section where the crystals are melted. A portion of the resulting melt is passed through the column countercurrent to crystal movement and in intimate contact therewith so as to displace occluded impurities. The present invention constitutes an improvement upon fractional crystallization apparatus which utilize a reflux stream to produce a high purity product.

When practicing a fractional crystallization process as described hereinabove, the high purity of product obtainable is believed to be due at least in part to the action of the reflux stream in contacting the crystals. It is believed that the reflux stream refreezes upon the crystals moving toward the melting zone, thereby displacing occluded impurities. A stream comprising displaced impurities is thereafter removed from the column upstream with respect to crystal movement of the melting zone. In order to effect a high degree of purification, it is important that all of the crystals be contacted with the reflux stream prior to entering the melting zone. In this regard, removal from the column of a stream rich in reflux liquid is an indication that the desirable reflux liquid-crystal contact is not occurring within the column. Another indication that the desired contact between the reflux liquid and crystals is not taking place is an increase in the temperature of the stream removed from the column upstream crystalwise of the melting zone. The primary cause of such poor contacting is believed to be due to channeling of the reflux stream through the column so that a portion of the crystals is not subjected to the action of the reflux in displacing occluded impurities by refreezing upon the crystals. One possible cause of channeling is that the shear stress of the crystals against the column wall, following the angle of repose of the crystals, compacts the crystals to a greater degree near the wall than toward the center of the column. The result is a non-uniform crystal mass having different physical characteristics. Channeling has been found to be more pronounced in large diameter columns than in smaller columns.

In order to obtain a higher relative degree of purification in practicing a fractional crystallization process of the type described, it becomes necessary to increase the amount of liquid passed into the moving mass of crystals as a reflux stream. As previously mentioned, the reflux stream refreezes upon the crystals upstream crystalwise of the melting zone, and with an increase in the amount of the liquid refrozen so as to obtain a desired higher purity product, a denser crystal bed is formed in the warm end of the column. Furthermore, the denser the warm end of the crystal bed becomes as a result of increasing the amount of liquid refrozen the more difficult it is to force the required reflux liquid up into the crystal bed, until finally, in some instances, the column may become plugged.

The reflux stream in refreezing upon the crystals gives up heat which raises the temperature of the crystals in the warm end of the crystal bed. This is the major source of heat for raising the temperature of the crystals to their melting point. As the difference between the crystal inlet temperature and the crystal melting point increases, it becomes necessary to increase the amount of reflux liquid in order to supply the required amount of heat. And, as mentioned above, the refreezing of an increasing amount of reflux liquid may in some cases cause the column to become plugged. In accordance with the instant invention, means are provided for preventing the channeling of reflux liquid through a purification column and for preventing plugging of the column as a result of refreezing of the reflux stream.

The following are objects of the invention.

It is an object of the invention to provide improved fractional crystallization apparatus.

Another object of the invention is to provide means for preventing the channeling of reflux liquid through the crystal purification column of fractional crystallization apparatus.

Still another object of the invention is to provide means for increasing the rate of heat transfer within the purification column of fractional crystallization apparatus so as to prevent plugging of the column.

A further object of the invention is to provide an improved method for separating and purifying components of liquid multi-component mixtures.

Other and further objects and advantages of the invention will become apparent to one skilled in the art upon consideration of the following disclosure.

Broadly speaking, the present invention resides in a means and method for preventing channeling of the displaced reflux stream in a crystal purification column and for preventing clogging of the column as a result of refreezing of the displaced reflux stream. In accordance with a broad aspect, the fractional crystallization apparatus of this invention comprises an elongated closed chamber, means for introducing crystals into one end of said chamber, means for melting crystals in the opposite end of the chamber and outlet means for withdrawing melt therefrom, a filtering means in the chamber upstream crystalwise of the melting means, and means for conducting heat through a downstream portion of the chamber between the crystal melting means and the filtering means. In a more specific embodiment of the invention, the heat conducting means comprises a grid member comprising longitudinally extending partitions. As a result of positioning a grid member in the purification chamber between the filtering means and melting means, channeling of the reflux liquid through the chamber is eliminated or substantially reduced, and heat is transferred from the melting zone into the crystal bed, thereby preventing the bed from becoming so dense as to cause plugging of the column.

The process and apparatus of this invention are applicable to a vast number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. Specific examples of organic systems to which this invention is applicable are recited in my copending U. S. application, Serial No. 438,051, filed June 21, 1954, and of particular importance, there may be mentioned separation of systems containing xylenes, systems containing cyclohexane, systems containing normal paraffins, and systems containing benzene, and the like. Thus, para-xylene can be separated from a multi-component mixture comprising isomeric alkyl benzenes, e. g. from a mixture of para- and meta-xylenes or from para-, meta-, and ortho-xylenes. In the same manner, benzene can be separated from a mixture comprising a paraffinic hydrocarbon such as n-hexane or n-heptane. Benzene may also be separated from a mixture of toluene and/or aniline. Cyclohexane can be separated from a mixture comprising cyclohexane and paraffinic hydrocarbons such as isomeric hexanes boiling close to cyclohexane.

Multi-component systems which may be effectively separated so as to recover one or more of the components in substantially pure form include 2,2-dimethylpentane, 2,4-dimethylpentane, 2,2,3-trimethylbutane, methyl cyclohexane, 2,2,4-trimethylpentane, and carbon tetrachloride, chloroform, and acetone. The invention is also applicable to the separation of individual components from a system of cymenes and a system including the xylenes. This invention can also be utilized to purify naphthalene, hydroquinone (1,4-benzenediol), paracresol, para-dichlorobenzene, and such materials as high melting waxes, fatty acids, and high molecular weight normal paraffins. Furthermore, the invention can be used to separate anthracene, phenanthrene, and carbazole and to separate durene (1,2,4,5-tetramethylbenzene) from $C_{10}$ aromatics.

It is not intended, however, to limit the invention to organic mixtures, but rather it is applicable to inorganic mixtures as well, and offers a practical method of separating, for example, two inorganic components between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed upwardly through the downwardly moving mass of crystals. This aspect of this invention is in general applicable in those instances where it is desired to increase the concentration of a solution by removing at least a portion of the solvent therefrom.

A more comprehensive understanding of the invention may be obtained by referring to the following description and the drawing in which:

Figure 1 is a diagrammatic elevational view of fractional crystallization apparatus illustrating the present invention;

Figure 2 is a perspective sectional view of the purification section of the fractional crystallization apparatus of Figure 1; and Figures 3, 4, and 5 are cross-sectional views illustrating different modifications of the grid member.

Referring now to Figure 1 of the drawing, fractional crystallization apparatus is illustrated which comprises an elongated crystal separation and purification column 10 closed at its upper and lower ends by closure members 11 and 12, respectively. The upper end of column 10 is provided with a compacting means or crystal mover, such as an impervious piston 13, connected by a connecting rod 14 to a hydraulic piston 16 in hydraulic cylinder 17. Lines 18 and 19 serve to pass hydraulic fluid alternately into and out of cylinder 17 so as to drive piston 16 which in turn causes the movement of piston 13. While piston 13 is shown as being an impervious piston, it is within the contemplation of the invention to utilize a porous piston in which case the piston operates as a filter as well as a means for moving crystals. When operating the column with a porous piston, an outlet line is connected to the upper end of the column for removal of liquid therefrom.

Filter section 21, disposed in an intermediate portion of crystal separation and purification column 10, comprises a filter screen 22, substantially cylindrical in shape, surrounded by a jacket 23. Line 24 connected to jacket 23 is for withdrawal of liquid from the filter section. A heating means is disposed in the lower end of column 10 in order to maintain a relatively high temperature at that end. As illustrated, the heating means is a coil 26 through which a heat transfer medium is circulated. It is not intended to limit the invention to the specific heat exchange means shown, for other suitable means can be employed. For example, an electrical heater can be positioned next to closure member 12, a coil can be disposed around column 10 at its lower end, or an electrical bayonet-type heater may be provided to extend into the end of the purification column. A liquid outlet line 27 is connected to the end of column 10 in order to provide means for removal of melt from the melting zone maintained in that end of the column by the heat exchange means.

The portion of column 10 below filter section 21 and with which the filter section communicates is the purification section 28 of the column. Disposed within the purification section between filter section 21 and heat exchange means 26 is grid member 29. The structure of the grid member will be described more fully hereinafter in conjunction with Figure 2.

Chiller 31 which comprises cylinder 32 and jacket 33 has a feed line 34 connected to the cylinder for introduction of feed material. Lines 36 and 37 provide means for introducing a heat exchange fluid or refrigerant, such as expanding liquid propane, into the annular space formed by cylinder 32 and jacket 33 and withdrawing the same therefrom. Chiller 31 may be equipped with means for moving crystals therethrough such as a reciprocal piston or auger. It is to be understood that other refrigeration means for forming crystals can be utilized without departing from the scope of the invention. A conduit 38 connects the delivery end of chiller 31 to filter 39 while conduit 41 connects the filter to feed conduit 42. Line 43 provides means for withdrawing mother liquor from the crystal slurry introduced into filter 39 from chiller 31. While filter 39 is preferably a rotary type filter, other means for separating crystals from the mother liquor may be employed such as an in-line filter or a centrifuge. Conduit 42 is connected to column 10 at a point above filter section 21 and below piston 13 when the piston is at the end of its back stroke. It is noted that when piston 13 is moving downwardly through column 10, the entrance of conduit 42 into column 10 is blocked by the piston. An auger 44 positioned within feed conduit 42 and connected to a motor provides means for moving crystals into the column.

Referring to Figure 2 of the drawing, there is shown a perspective sectional view of purification section 28 of Figure 1. Elements previously described in conjunction with the discussion of Figure 1 are designated by the same reference numerals. Grid member 29 comprises longitudinally extending partitions 46 which are arranged so as to form a plurality of cells or passageways 47 open at both ends. As shown in Figure 2, the partitions are so assembled that each of the cells, except those adjacent the column wall, has a substantially square cross section. Examples of other forms which the grid member may take are shown in Figures 3, 4 and 5. Thus, in Figures 3 and 4 the grid comprises cells or passageways having a hexagonal cross section, the cells or passageways in the grid of Figure 3 being larger in number than those formed by the partition members of Figure 4. The grid member of Figure 5 comprises a cylindrical member 51 axially disposed within the purification section and radial vanes 52 extending between the cylindrical member and the wall of the purification section. It is apparent that the grid member of this invention may take still other forms which will fall within the spirit and scope of the invention.

As illustrated in Figures 1 and 2, grid member 29 is positioned within the column between filter section 21 and heat exchange means 26. The bottom end of the grid element is preferably located just above the heat exchange means while the top of the element is preferably disposed below the filter section. The grid member is preferably constructed of a metal which has good heat conducting properties such as copper, silver or aluminum and alloys of these or similar metals.

While the fractional crystallization apparatus of Figure 1 is for the sake of clarity illustrated and described as occupying a substantially vertical position, it is not intended to so limit the invention. It is to be understood that the apparatus can be otherwise disposed without departing from the spirit or scope of the invention. Thus, the separation and purification column can be positioned horizontally, or the column can be operated vertically but with the melting zone in the top of the column rather than the bottom as illustrated. Furthermore, while the invention has been described in conjunction with a separation and purification column which utilizes a piston as a means for advancing crystals through the column, the invention is not limited to any specific column, but rather it is applicable to any crystal purification column which utilizes a reflux stream to obtain a high purity product.

In the operation of the apparatus of Figures 1 and 2, a liquid feed mixture, which can be a liquid multi-component mixture containing components of different melting point, is introduced through line 34 into chiller 31. Refrigerant is passed into the annular space between cylinder 32 and annular jacket 33 through line 36 and withdrawn therefrom through line 37 at a rate sufficient to maintain chiller 31 at a temperature low enough to crystallize one of the components. The crystal slurry formed within chiller 31 is removed therefrom through conduit 38 and passed into filter 39 which acts as a prefilter. In filter 39 mother liquor is separated from the crystal slurry and withdrawn from the filter through line 43 while the crystals with remaining mother liquor are removed from the filter through conduit 41 and then passed into feed conduit 42.

From conduit 42 the thickened slurry of crystals in mother liquor is moved by means of auger 44 into separation and purification column 10. As previously discussed, piston 13 is so constructed that introduction of material into the column is possible only when the lower end of the piston is above the entrance end of conduit 42. The slurry on entering column 10 is moved downwardly by piston 13 into filter section 21. Piston 13 is forced downwardly and upwardly by means of hydraulic piston 16 which is moved in response to fluid introduced and withdrawn from hydraulic cylinder 17 through lines 18 and 19. By this manner of operation, piston 13 on its compression stroke forces crystals downwardly through the column while on its back stroke crystals are allowed to pass into the column through feed conduit 42.

Within filter section 21 additional mother liquor is separated from the crystals and removed through line 24. The crystals thereafter continue their movement downwardly through the column as a result of the force exerted by piston 13. On leaving filter section 21, the crystals are moved as a single uniform mass having a cross-sectional area equal to that of the column. With further downward movement of the crystals, the mass of crystals encounters grid member 29 and is thereby divided into a plurality of uniform masses or streams of crystals, each mass having a cross-sectional area equal to that of the individual cells or passageways 47. The crystals continue to move downwardly through the grid member and thereafter enter the melting zone maintained in the end of the column by heat exchange means 26.

The melting zone is maintained at a temperature at least as high as the melting point of the crystals by continuously circulating a heat exchange medium through coil 26 of the heat exchange means. On reaching the melting zone, at least a portion of the crystals are melted, and a portion of the resulting melt is displaced upwardly as a reflux stream into the downwardly moving mass of crystals and in intimate contact therewith. It is believed that substantially all of the melting of the crystals occurs in that portion of the melting zone adjacent the bottom of the grid member, but in some cases some melting may take place in the bottom portion of the grid member itself. The reflux stream on contacting the crystals upstream crystalwise of the melting zone displaces occluded impurities from the crystals by refreezing thereon. A liquid stream comprising displaced impurities is removed from column 10 through filter section 21 by means of line 24. A substantially pure product in the form of melt is withdrawn from the melting zone through line 27.

As previously noted, the high degree of purification obtainable is believed to be due at least in part to the action of the reflux liquid refreezing upon the crystals and displacing occluded impurities therefrom. In moving through a purification column divided above the melting zone into a plurality of cells or passageways 47, the crystals are in effect divided into a plurality of crystal masses. Since the distance from the center of any crystal mass to the wall of its passageway is comparatively small, the tendency of the crytals to compact near the wall is greatly reduced so that the crystal masses have the same physical characteristics throughout. Thus, the tendency of the reflux stream to channel is eliminated or substantially reduced, and it is possible to obtain good contact between the reflux stream and the crystals.

During the practice of the process as described above, heat is conducted from the melting zone upwardly through the purification section by means of grid member 29. By so providing for the transfer of heat through the lower end of the crystal bed, the bed is not allowed to become so dense as to prevent passage of reflux liquid into the bed. The desirability of providing for means for transferring heat through the lower end of the crystal bed is especially pronounced when the column is operated to obtain a high degree of purification since under these conditions it is necessary to reflux an increased amount of liquid and plugging of the column may result in some cases. Furthermore, the provision of a heat transfer means in the lower end of the purification column of this invention makes it possible to operate the column over a wide temperature range without plugging of the column. As mentioned hereinabove, the reflux stream in refreezing upon the crystals gives up heat which raises the temperature of the crystals in the lower end of the crystal bed. Because of the transfer of heat from the melting zone through the lower portion of the crystal bed, it becomes unnecessary to supply as much reflux liquid to raise the temperature of the crystals to their melting point, or alternatively with the same amount of reflux liquid the column can be operated at a lower crystal inlet temperature without the bed becoming so dense as to cause plugging of the column.

A more comprehensive understanding of the invention may be obtained by referring to the following illustrative example, which is not intended, however, to be unduly limitative of the invention.

*Example*

A feed material containing about 41 weight percent para-xylene is charged to the chiller of fractional crystallization apparatus similar to that of Figure 1 at a temperature of about 90° F. and at a rate of 520 gallons per hour. The feed mixture is cooled in the chiller to a temperature of −30° F., causing para-xylene to crystallize and forming a slurry containing 20 percent solids. The slurry is introduced into a rotary filter where mother liquor containing 26 weight percent para-xylene is separated from the slurry at a rate of 260 gallons per hour. The resulting slurry containing 40 percent solids is passed into the crystal separation and purification column at a rate of 260 gallons per hour. The slurry is moved through the column by means of a piston into the filter section where additional mother liquor containing 26 weight percent para-xylene is recovered at a rate of 156 gallons per hour. The mass of crystals as a result of the force exerted thereon by the column piston moves through the column toward the melting zone maintained in the end of the column at a temperature above the melting point of para-xylene crystals. Downstream from the filter section, the moving mass of crystals is divided into a plurality of smaller moving masses of crystals by means of the grid member disposed within the column between the filter section and the melting zone. After passing through the grid member, the crystals enter the melting zone wherein they are melted. A portion of the melt is displaced as a reflux stream into the moving mass of crystals and refreezes upon the crystals displacing occluded impurities. A stream comprising displaced impurities passes through the column and is withdrawn through the filter section. A stream containing 99 weight percent para-xylene is withdrawn from the melting zone at a rate of 104 gallons per hour as a product of the process.

It will be apparent to those skilled in the art that various modifications of the invention can be made upon study of the accompanying disclosure. Such modifications are believed to be clearly within the spirit and the scope of this invention.

I claim:

1. In apparatus for the separation and purification of crystals comprising, in combination, an elongated, closed chamber; means for introducing crystals into one end portion of said chamber, heating means associated with the opposite end portion of said chamber, product outlet means in said opposite end portion of said chamber, and at least one filter means for withdrawing liquid from an intermediate portion of said chamber, the improvement which comprises at least one longitudinally elongated, heat transfer partition means disposed within said chamber between said heating means and said filter means and extending along a substantial length of said chamber.

2. Apparatus for the separation and purification of crystals which comprises, in combination, a crystal purification column; means for introducing crystals into one end of said column; means for melting crystals in the opposite end of said column and outlet means for withdrawing melt therefrom; at least one filtering means in said column between said crystal melting means and said crystal introduction means; and at least one longitudinally elongated, heat transfer partition means disposed within said column between said filtering means and said crystal melting means and extending along a substantial length of said column.

3. Apparatus for the separation and purification of crystals which comprises, in combination, a crystal purification column; means for introducing crystals into one end of said column; means for melting crystals in the opposite end of said column and outlet means for withdrawing melt therefrom; at least one filtering means in said column between said crystal melting means and said crystal introduction means; and a grid member comprising longitudinally extending walled passageways positioned within said column between said filtering means and said crystal melting means and extending along a substantial length of said column, said grid member being adapted to transfer heat through said column.

4. Apparatus for the separation and purification of crystals which comprises, in combination, a crystal purification column; means for introducing crystals into one end of said column; means for heating the opposite end of said purification column; outlet means connected to said opposite end; means for advancing crystals through said column toward said heating means; at least one filtering means in an intermediate portion of said purification column; a grid member comprising longitudinally elongated partitions positioned within said column between said filtering means and said heating means and extending along a substantial length of said column, said grid member being adapted to transfer heat through said column.

5. The apparatus of claim 4 in which said grid member comprises longitudinally extending partitions so arranged as to form a plurality of cells open at both ends and having a substantially square cross section.

6. The apparatus of claim 4 in which said grid member comprises longitudinally elongated partitions so arranged as to form a plurality of cells open at both ends and having a substantially rectangular cross section.

7. The apparatus of claim 4 in which said grid member comprises longitudinally elongated partitions so arranged as to form a plurality of cells open at both ends and having a substantially hexagonal cross section.

8. The apparatus of claim 4 in which said grid member comprises a substantially cylindrical member centrally disposed within said column and radial vanes extending between said cylindrical member and the walls of said column.

9. Apparatus for the separation and purification of crystals which comprises, in combination, a crystal purification column; a heating means operatively connected to one end of said purification column; outlet means connected to said end of said column; means for moving crystals through said column toward said heating means; at least one filtering means in an intermediate portion of said column; liquid outlet means connected to said filtering means; a grid member comprising longitudinally elongated metal partitions positioned within said column between said filtering means and said heat exchange means and extending along a substantial length of said column, said grid member being adapted to transfer heat through said column; a cooling chamber having a liquid feed inlet connected thereto; conduit means connecting said cooling chamber to the opposite end of said column from said heating means; and means for moving a crystal slurry through said conduit means.

10. A process for separating a component from a liquid multi-component mixture which comprises passing crystals, formed by said component by cooling said mixture, into a purification zone; moving said crystals through said purification zone toward a melting zone; in an intermediate portion of said purification zone passing said crystals through a plurality of adjacent passageways having walls formed of a material of high heat conductivity; moving said crystals from said passageways into said melting zone; melting crystals in said melting zone; displacing at least a portion of the resulting melt into said moving crystals; transferring heat through said material of high heat conductivity from said melting zone through said purification zone upstream crystal wise from said melting zone; and removing a product from said melting zone.

11. A process for separating a component from a liquid multi-component mixture which comprises cooling said mixture so as to crystallize one of said components; separating crystals from the components of said mixture; passing said crystals into a purification zone; moving said crystals through said purification zone toward a melting zone; in an intermediate portion of said purification zone passing said crystals through a plurality of adjacent passageways having walls formed of a material of high heat conductivity; moving said crystals from said passageways into said melting zone; melting crystals in said melting zone; displacing at least a portion of the resulting melt into said moving crystals; transferring heat through said material of high heat conductivity from said melting zone through said purification zone upstream crystalwise from said melting zone and removing a product from said melting zone.

12. The process of claim 11 in which heat is transferred from said melting zone through said passageways within said purification zone.

13. The process of claim 11 in which said multi-component mixture comprises alkylbenzenes.

14. The process of claim 13 in which said mixture contains paraxylene, and said para-xylene is recovered as the product.

15. The process of claim 11 in which said multi-compent mixture comprises benzene and a paraffinic hydrocarbon, and benzene is recovered as the product.

16. The process of claim 11 in which said multi-component mixture comprises cyclohexane and a paraffinic hydrocarbon, and cyclohexane is recovered as the product.

17. A process for separating a component from a liquid mutli-component mixture which comprises cooling said mixture so as to crystallize one of said components; passing the resulting slurry of crystals in mother liquor into a filter zone; removing mother liquor from said filter zone; passing said crystals into one end of a purification zone so as to form therein a uniform mass of crystals; moving said mass of crystals through said purification zone toward a melting zone in the downstream end crystalwise of said purification zone; in an intermediate portion of said purification zone dividing said moving mass of crystals into a plurality of smaller moving masses of crystals by passing said mass of crystals into a plurality of adjacent passageways having walls formed of a material of high heat conductivity; moving said crystals from said passageways into said melting zone; melting crystals in said melting zone; displacing at least a portion of the resulting melt from said melting zone into said moving crystals so as to intimately contact said crystals; refreezing said displaced liquid upon said crystals in the downstream portion crystalwise of said purification zone; transferring heat through said material of high heat conductivity from said melting zone through said purification zone upstream crystalwise from said melting zone; and removing a product from said melting zone.

18. A process for purifying a material in crystalline form which comprises moving crystals of said material through a purification zone into a melting zone; in an intermediate portion of said purification zone passing said crystals through a plurality of adjacent passageways having walls formed of a material of high heat conductivity; melting said crystals in said melting zone; passing part of the resulting molten material into contact with said moving crystals; transferring heat through said material of high heat conductivity from said melting zone through said purification zone upstream crystalwise from said melting zone; and recovering the remainder of said molten material as a product of the process.

References Cited in the file of this patent

UNITED STATES PATENTS

| | | |
|---|---|---|
| 2,613,136 | McKay | Oct. 7, 1952 |
| 2,617,274 | Schmidt | Nov. 11, 1952 |
| 2,643,217 | Watson et al. | June 23, 1953 |
| 2,683,178 | Findlay | July 6, 1954 |
| 2,747,001 | Weedman | May 22, 1956 |